United States Patent
Augustinos et al.

(10) Patent No.: US 8,539,083 B2
(45) Date of Patent: Sep. 17, 2013

(54) INTELLIGENT ROUTING OF COORDINATED AUDIO, VIDEO, WEB SERVICES AND MEASUREMENT DATA STREAMS

(75) Inventors: Nicholas Augustinos, San Francisco, CA (US); Jack Chi Cham, San Leandro, CA (US); Ping Li, Fremont, CA (US); Dave M. Singhal, San Jose, CA (US); Shawn Hsiao-Ping Yang, Morgan Hill, CA (US); Danyang R. Zheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 680 days.

(21) Appl. No.: 12/720,335

(22) Filed: Mar. 9, 2010

(65) Prior Publication Data

US 2010/0235517 A1   Sep. 16, 2010

Related U.S. Application Data

(60) Provisional application No. 61/159,244, filed on Mar. 11, 2009.

(51) Int. Cl.
*G06F 15/16* (2006.01)

(52) U.S. Cl.
USPC .......... 709/227; 709/203; 709/223; 709/224; 709/230

(58) Field of Classification Search
USPC ................. 709/203, 217, 223, 224, 225, 227, 709/228, 230
See application file for complete search history.

(56) References Cited

U.S. PATENT DOCUMENTS

| | | | |
|---|---|---|---|
| 6,205,716 B1 | 3/2001 | Peltz | 52/36.2 |
| 6,223,165 B1 * | 4/2001 | Lauffer | 705/26.41 |
| 6,230,287 B1 * | 5/2001 | Pinard et al. | 379/265.09 |
| 6,470,390 B1 * | 10/2002 | Westfield | 709/227 |
| 6,513,013 B1 * | 1/2003 | Stephanou | 705/26.1 |
| 6,535,492 B2 * | 3/2003 | Shtivelman | 370/270 |
| 6,978,304 B2 * | 12/2005 | Fertell et al. | 709/224 |
| 7,046,779 B2 | 5/2006 | Hesse | 379/202.01 |
| 7,120,647 B2 * | 10/2006 | Venkatesh et al. | 707/942 |
| 7,129,970 B2 | 10/2006 | James et al. | 348/14.01 |
| 7,539,733 B2 * | 5/2009 | Mohammed et al. | 709/223 |
| 7,668,912 B2 * | 2/2010 | Nelson et al. | 709/224 |
| 7,958,215 B2 * | 6/2011 | Herbeck et al. | 709/227 |
| 2002/0059378 A1 * | 5/2002 | Mustafa | 709/205 |
| 2005/0192844 A1 * | 9/2005 | Esler et al. | 705/3 |

OTHER PUBLICATIONS

Cisco Collaborative Care—Language Interpretation Services Design and Implementation Guide, dated 2007, pp. 1-170, Cisco Sytems, Inc., downloaded from www.cisco.com.
Video Interpreters Connect Patients and Doctors, dated 2007, pp. 1-4, Cisco Systems, Inc., downloaded from www.cisco.com.

* cited by examiner

*Primary Examiner* — Ramy M Osman
(74) *Attorney, Agent, or Firm* — Brinks Hofer Gilson & Lione

(57) ABSTRACT

A system may receive a request from a client station to communicate with any available expert that matches at least one criterion. The system determines an identity of an expert station associated with an expert matching the at least one criterion. The system may then establish a session between the client station and the expert station, where the session includes a first connection and a second connection, the first connection is for transmission of audio/video, and the second connection is for transmission of telemetry data during the transmission of the audio/video. The telemetry data is measured at the client station.

20 Claims, 4 Drawing Sheets

INTELLIGENT ROUTING OF COORDINATED AUDIO, VIDEO, WEB SERVICES AND MEASUREMENT DATA STREAMS

This application claims priority under 35 U.S.C. §119(e) to U.S. Provisional Application No. 61/159,244, "INTELLIGENT ROUTING OF COORDINATED AUDIO, VIDEO, WEB SERVICES AND MEASUREMENT DATA" filed Mar. 11, 2009, the entire contents of which are hereby incorporated herein by reference.

TECHNICAL FIELD

The present disclosure relates generally to memory and, in particular, to memory management.

BACKGROUND

Remote expert access systems may connect a client with an expert. For example, the client may call the expert to discuss a question.

Current remote expert access systems facilitate a client connecting to a specific endpoint identified by the client. For example, the client may enter a phone number of a particular expert or a phone number of a particular physical location, such as a phone number of a center of expertise. The remote expert access system may then establish a phone call or a video conference between a source endpoint that initiated the phone call and an destination endpoint specifically identified by the client.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

Figure 1:
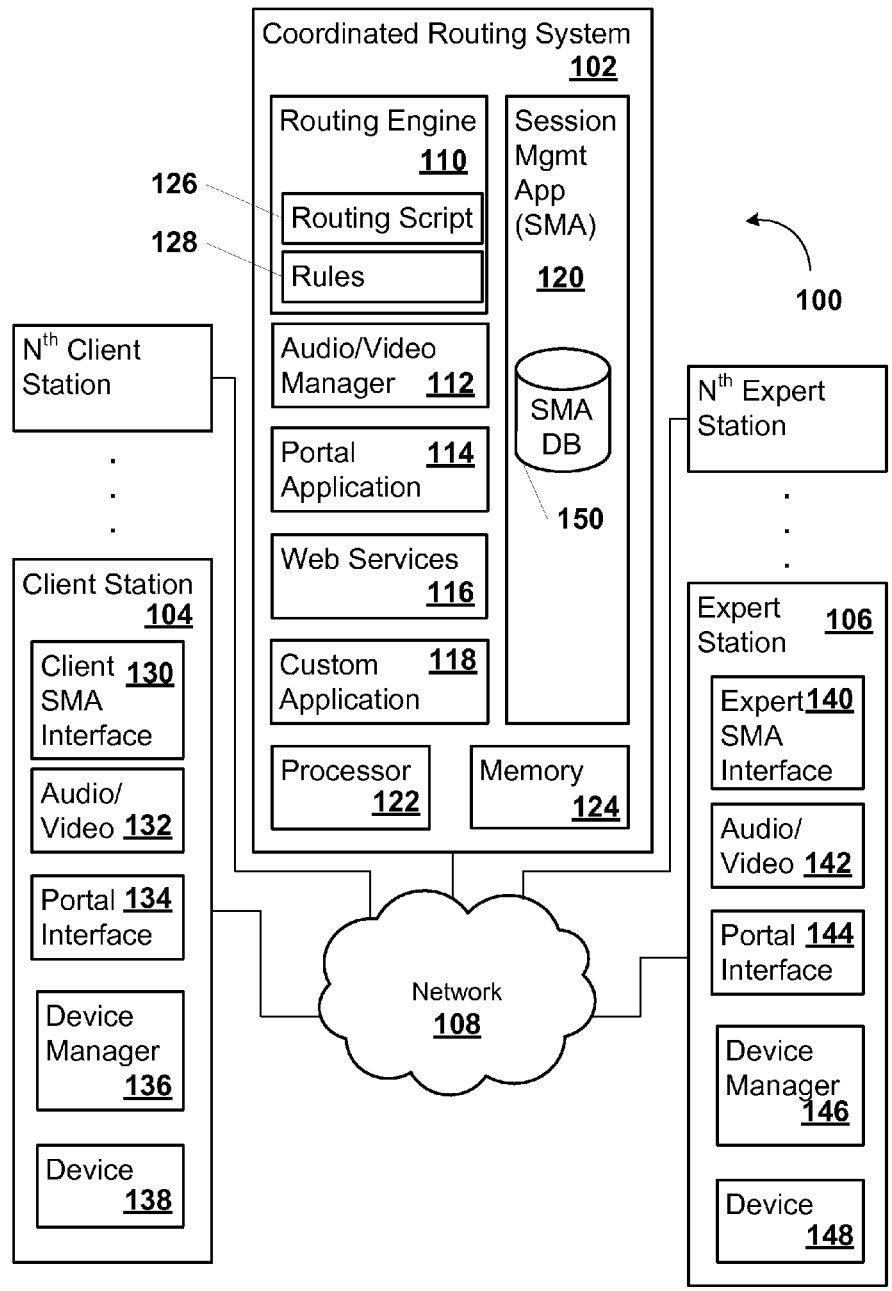
FIG. 1 illustrates one embodiment of a system for rule-based routing of coordinated streams of video and measured data.

By way of introduction, the example embodiments described below include a system, logic encoded in a computer readable media, and a method for routing coordinated streams of audio/video and measured data.

According to a first aspect, a system is provided. The system receives a request from a client station to communicate with any available expert that matches at least one criterion. The system determines an identity of an expert station associated with an expert matching the at least one criterion. The system establishes a session between the client station and the expert station, where the session includes a first connection and a second connection. The first connection is for transmission of audio/video. The second connection is for transmission of telemetry data during the transmission of the audio/video. The telemetry data is measured at the client station.

In a second aspect, logic encoded in a computer readable media is provided. The logic is operable to receive a request to communicate with any available expert matching at least one criterion from a client station. The logic is further operable to determine an identity of an expert station associated with an expert matching the at least one criterion. The logic may start a session between the client station and the expert station, where the session includes a first connection and a second connection, the first connection is for transmission of audio/video, and the second connection is for transmission of telemetry data generated by a device at the client station.

In a third aspect, a method is provided. A request to connect to any expert that meets at least one criterion is transmitted from a client station, where the at least one criterion and the request do not include an identity of a matching expert or an identity of an expert station associated with the matching expert. The identity of the expert station associated with the matching expert is received at the client station in response to the request to connect. Audio/video is communicated over a first connection between the client station and the expert station. Telemetry data measured by at least one device in the client station is received at the client station. The telemetry data is transmitted over a second connection from the client station to the expert station. Both the first and second connections are included in a session between the client station and the expert station.

The present invention is defined by the following claims, and nothing in this section should be taken as a limitation on those claims. Further aspects and advantages of the invention are discussed below in conjunction with the example embodiments.

Example Embodiments

A client using a remote expert access system may not know in advance an identity of an expert or a location where the expert is available. The client may instead know what type of expert is sought. In addition to video conferencing with the client, the expert may also need information about the client in order to appropriately advise the client. For example, the expert may need information measured at the client's location, such as a doctor needing vitals taken of a patient in order to make a diagnosis.

In one example implementation, a system for rule-based routing of coordinated streams of audio, video, and measured data may include client stations and expert stations in communication with a coordinated routing system. The client stations and expert stations may include teleconferencing equipment and additional devices. For example, the client station may include a stethoscope and a heart monitor. The coordinated routing system may be a server machine or a collection of server machines.

During operation of the example implementation, experts may sign into the coordinated routing system via the expert stations in order to indicate that the experts are available to help clients. The coordinated routing system may store attributes of each of the experts. For example, the attributes may include the type of expert, the gender of the expert, what languages the expert speaks, or any other descriptive attribute. A client at one of the client stations may indicate to the coordinated routing system what type of expert the client seeks. The coordinated routing system may determine whether any of the expert stations have an expert available that matches the type of expert sought by the client. If any of the expert stations match, then the coordinated routing system may initiate a session between the matching expert station and the client station. The session may include a video conferencing session. Furthermore, the coordinated routing system may initiate communication of at least one data stream from the client station to the expert station during the session. The data stream includes measured data that the expert may use in rendering an opinion. For example, the data stream may provide stethoscope audio generated at the client station to head phones at the expert station. The coordinated routing system may disconnect the data stream when the video conference session ends or in response to receiving an indication that the expert is finished with the data stream.

The coordinated routing system may make information related to the client or expert available based on the session. For example, the session may include an identity of the client. Therefore, a custom application used by the expert and/or the client may invoke a web service in the coordinated routing system to obtain the identity of the client. The custom application may provide, based on the identity of the client, enriched and/or contextualized information to the expert and/or the client. The enriched and/or contextualized information may be stored in an insurance company database or some other database and may include information gathered during previous encounters with the client, such as a medication history of the client.

Clients may not have to determine in advance who has a desired expertise and then schedule an appointment with that individual. The expert may obtain data measured in real-time at a client station in order to supplement information conveyed in a video conference between the client and expert. A better end user experience between the client and the expert results.

FIG. 1 illustrates one embodiment of a system 100 for rule-based routing of coordinated streams of video and measured data. The system 100 may include a coordinated routing system 102, at least one client station 104 and at least one expert station 106. The client station 104 and expert station 106 may be in communication with the coordinated routing system 102 over a network 108. The system 100 may include additional, different or fewer components. For example, the system 100 may include the coordinated routing system 102 without the client station 104 and the expert station 106. Alternatively, the system 100 may include the client station 104 but not the coordinated routing system 102 and the expert station 106. Alternatively, the system 100 may include the expert station 104, but not the coordinated routing system 102.

The coordinated routing system 102 may be any device, combination of devices, processes, or any combination thereof that determines an identity of the expert station 106 based on rules applied to criterion or criteria and initiates a session between the expert station 104 and the client station 106. The session may include an audio/video connection and a device connection for transportation of measured data. The criterion may include any attribute with which to find a match. The criterion may or may not include either the identity of the expert or the identity of the expert station 104. Examples of the coordinated routing system 102 include, but are not limited to: a software application, a combination of software applications, a server machine, a combination of server machines, a blade server, a combination of blade servers, or any combination thereof.

The term "audio/video" in this document refers to audio, video, or a combination of both in which the audio and video are synchronized. Therefore, in one example, the coordinated routing system 120 may initiate the session that includes an audio connection, such as a telephone call, and the device connection, but not a video connection. In a second example, the coordinate stream router 120 may initiate the session that includes the device connection and a connection for both video and audio, where both the video and audio are synchronized with each other.

The coordinated routing system 102 may include a routing engine 110, an audio/video manager 112, a portal application 114, web services 116, a custom application 118, and a session management application 120. The coordinated routing system 102 may include additional, different, or fewer components. For example, the coordinated routing system 102 may include a processor 122 and a memory 124.

The routing engine 110 may be any process, device, or any combination thereof that routes at least a portion of the session from the client station 104 to the expert station 106 based on business rules 128. The routing engine 110 may use network presence technologies or any other technique now known or later discovered to identify who is present on the network 108 at which station, such as determining who is logged in at the expert station 106. The routing engine 110 may match routing scripts 126 that include information about what experts are available on the network 108 with attributes of the available experts. The routing engine 110 may establish a session with one of the available expert stations based on the matches. Therefore, in one example, the routing engine 110 may include an automatic call distributor (ACD) that distributes incoming calls among a group of call agents, such as Cisco Unified Contact Center Enterprise from Cisco Technologies. In one example, the routing engine 110 may establish the audio/video connection but not the device connection between the client station 104 and expert station 106.

The business rules 128 used by the routing engine 110 may be preconfigured or configured dynamically. The business rules 128 may be computer instructions or scripts that indicate how routing should be performed specific to a business or an organization. The business rules 128 may include policies of the business or the organization. Examples of the business rules 128 include, but are not limited to: routing to a preferred hospital, routing to a preferred provider, routing to an in-network provider first, and routing to a particular type of provider first. In one example, if the client is enrolled in a healthcare insurance plan from a particular healthcare provider, the business rules 128 may indicate to the routing engine 110 that the session should be routed to the expert station 106 associated with an expert in a hospital owned by the particular healthcare provider. In a second example, if the client is enrolled in a healthcare insurance plan that provides different coverage depending on whether a doctor belongs to a healthcare network of providers, then the business rules 128 may indicate to the routing engine 110 that the session should be routed to the expert station 106 associated with an expert that belongs to the healthcare network of preferred providers. In a third example, if no expert is available—or available within a predetermined period of time in the healthcare network of providers—then the business rules 128 may indicate to the routing engine 110 that the session should be routed to the expert station 106 associated with an expert that does not belong to the healthcare network.

The business rules 128 may be configured to form virtual networks. For example, the business rules 128 may indicate that a first patient enrolled in a first healthcare insurance plan should be routed to resources under the control of the first healthcare insurance plan. Additionally, the business rules 128 may indicate that a second patient enrolled in a second healthcare insurance should be routed to resources under the control of the second healthcare plan. Therefore, although patients enrolled in either the first or second healthcare insurance plans may use the same client station 104, the coordinated routing system 102 enforces a virtual network for each of the healthcare insurance plans. The business rules 128 for an organization associated with a virtual network may be modified to route to resources in another network if the organization later wishes to do so.

The routing engine 110 and/or the SMA 110 may determine the business rules 128 from scripts. Alternatively or in addition, the business rules 128 may be embodied in compiled executable instructions.

The business rules 128 may be specific to a particular deployment or implementation. The scripts 126 may be generated dynamically by users of the system. For example, the portal application 114 or some other application may enable an administrator user to specify through a graphical user interface the business rules 128 for a particular deployment. In one implementation, the client may select preferred characteristics of an expert through the graphical user interface. For example, the preferred characteristics may include language skills, expert specialty, in or out of network preference, or any other type of attribute that describes an expert. The selections made by the client may correspond to the parameters for the routing. The portal application 114 may then generate the scripts 126 based on the input received through the graphical user interface.

Alternatively or in addition, information used to generate the scripts 126 or to otherwise implement the business rules 128 may be obtained, for example, through the web services 116. The web services 116 may access one or more databases to provide the information used to implement the business rules 128. For example, in order to determine whether the client is enrolled in a healthcare insurance plan from a particular healthcare provider, a web service may access a database populated with membership information from the particular healthcare provider. The web service may return one of the scripts 126 that is executable with the routing engine 110.

The routing engine 110 may include software tools, APIs (application programming interfaces), or both that enable software components to configure the routing engine 110. For example, the routing engine 110 may implement an API that facilitates programmatically setting parameters of, and providing other configuration information to, the routing engine 110. For example a software component, such as the custom application 118, may make calls to the API in order to dynamically establish connections among endpoints, such as the client station 104 and the expert station 106, based on the business rules 128. The software component may provide the information via the API in the form of the routing script 126, for example.

For example, Table 1 below illustrates an example of Java code controlling routing of the session by providing information via the API implemented in the routing engine 110.

TABLE 1

Example of Java Invoking the API of the Routing Engine

```
// provider administrator can use this to map specialty queue phone number to nurse
selections.
class DocQ{
    public static final string doc1 = 51001; // Family Practice Queue uses x51001
    public static final string doc2 = 51002; // Dermatologist Queue uses x51002
    public static final string doc3 = 51003; // Gastroenterologist Queue uses x51003
}//end class DocQ
public void ConnectToDoctorQ(PatientstationInfo patientStationInfo, string sessionNum,
int SpecialtyReq)
{
    // This is an example of how an administrator user can
    // map the patentienCallerNumber to the desired doctor Queue
    private string DocActualNum;
    switch (SpecialtyReq) {
    case 1:
        DocActualNum = Connection.connectCall(patientStationInfo.callerID, DocQ.doc1);
        // call to Contact Center API to make A/V connections, CC should return
doctor's actual number
        DoctorStationInfo = LookupConfigDB.docPhone(DocActualNum);
        // ConfigDB may include static information about stations. Look up doctor
station record based on doc phone#
        PopulateSMADB.Telemetry(patientStationInfo, sessionNum, DoctorStationInfo);
        // This effectively binds the patientStationInfo, docStationInfo and session#
dynamically together
        Break;
    case 2:
        DocActualNum = Connection.connectCall(patientStationInfo.callerID, DocQ.doc2);
        DoctorStationInfo = LookupConfigDB.docPhone(DocActualNum);
        populateSMADB.Telemetry(PatientStationInfo, sessionNum, DoctorStationInfo);
        Break;
    case 3:
        DocActualNum = Connection.connectCall(patientStationInfo.callerID, DocQ.doc3);
        DoctorStationInfo = LookupConfigDB.docPhone(DocActualNum);
        PopulateSMADB.Telemetry(PatientStationInfo, sessionNum, DocActualNum);
        Break;
    default: System.out.println("Case Default SpecialtyReq");
    }
}
```

The audio/video manager 112 may be any process, device, or any combination thereof that establishes audio/video connections between identified client stations and identified expert stations. In a first example, the audio/video manager 112 is included in the routing engine 110. In a second example, the routing engine 110 is in communication with the audio/video manager 112 in order to establish the audio/video connection between the client station 104 and the expert station 106. Examples of the audio/video manager 112 include, but are not limited to a teleconferencing server, Cisco TELEPRESENCE™ Manager server, which is a registered trademark of Cisco Technologies, an IP (Internet protocol) telephony call-processing system, Cisco Unified Communications Manager, or a conferencing bridge.

The session management application (SMA) 120 may be any process, device, or any combination thereof that may establish, maintain, and otherwise manage sessions between the stations, such as between the client station 104 and the expert station 106. The SMA 120 may be in communication with the routing engine 110, the audio/video manager 112, and the stations, such as the client station 104 and the expert station 106. The SMA 120 may coordinate the connections in the session, such as the audio/video connection and the device connection. The session includes the audio/video connection and at least one device connection. The session may include additional information, such as information related to the session. For example, the session may include an identity of a patient at the client station 104 and an identity of an expert at the expert station 106. The SMA 120 may maintain session information and information about registered stations in an SMA database 150. The SMA database 150 may be included in the SMA 120. Alternatively or in addition the SMA database 150 may be separate from the SMA 120.

The session may be an information interchange between two or more stations. The session is set up or established at one point in time, and torn down at a later point in time. The session is stateful. The SMA 120 may maintain session state in the SMA database 150. The connections established as part of the session may be established using any protocol, such as TCP/IP (transmission control protocol Internet protocol), SIP (session initiation protocol), HTTP (Hypertext Transfer Protocol), or any other communications protocol now known or later discovered. The length of the session may be tied to one or more of the connections included in the session. For example, the duration of the session may be based on the duration of the audio/video connection. For example, the session may begin when the audio/video connection is opened and end when the audio/video connection is closed.

The SMA 120 may include an API (application programming interface). The API may provide access to the session information. Alternatively or in additional, the API may provide an ability to initiate sessions or connections within sessions. Alternatively or in addition, the API may provide services related to, but not limited to: dynamic routing between stations, acquiring data from third party devices and other data sources, invoking web services 116 through a web services invocation framework, integrating third party devices and other data sources, integrating and synchronizing audio/video steams in the audio/video connections with the device streams over the device connections, quality of service features, security features, identity and presence services.

The portal application 114 may be any process, device, or any combination thereof that authenticates users of the coordinated routing system 102. The portal application 114 may include a web application that may or may not include a portal that is customizable with portlets. The portal application 114, upon authentication of a user, may redirect the user to the custom application 118. Alternatively or in addition, the portal application 114 may be configured to include a portlet that executes and/or redirects the user to the custom application 118.

The custom application 118 may be any process, device, or any combination thereof that processes information related to the session created between the client station 104 and the expert station 106. The system 100 for rule-based routing of coordinated streams of video and measured data has many real-world applications. To that end, the custom application 118 may be specific to any one or more of those real-world applications. In one example, the custom application 118 may be for doctors and generate web pages viewable on the expert station 106. The web pages may provide medical related information, such as a patient's name, a patient's vitals measured at the client station 104, a patient's medical records, a prescription from a doctor to patient, drug dispensing instructions from the doctor, or any other data derived from the session. In a second example, the custom application 118 may be for a banking expert and generate web pages that include information scanned from a card reader at the client station 104 and other information related to a financial transaction desired by a user at the client station 104.

The web services 116 may be any process, device, or any combination thereof that provides the custom application 118 with access to information related to the session. For example, through the web services 116, the custom application 118 may determine the identity of a user at the client station 104. Alternatively or in addition, the custom application 118 may receive data measured at the client station 104 during the session from the web services 116. Alternatively or in addition, the custom application 118 may receive any other information related to the session. Alternatively or in addition, the web services 116 may provide an API (application programming interface) with which components such as the SMA 120 may access the custom application 118.

The coordinated routing system 102 may be in communication with the client station 104 and the expert station 106 over the network 108. Examples of the network 108 include, but are not limited to: a local area network (LAN), a wireless local area network (WLAN), a personal area network (PAN), a wide area network (WAN), the Internet, any other now known or later developed communications network, and any combination thereof.

The memory 124 may be any now known, or later discovered, tangible data storage device. The memory 124 may include non-volatile memory, volatile memory, or any combination thereof. Examples of the memory 124 include, but are not limited to, a random access memory (RAM), a read-only memory (ROM), an erasable programmable read-only memory (EPROM), or flash memory. The memory 124 may include an optical, magnetic (hard-drive) or any other form of data storage device.

The processor 122 may be in communication with the memory 124. The processor 122 may also be in communication with additional components, such as a display (not shown) and a network interface card (not shown). The processor 122 may be a general processor, central processing unit, server, application specific integrated circuit (ASIC), digital signal processor, field programmable gate array (FPGA), digital circuit, analog circuit, or combinations thereof. The processor 122 may be one or more devices operable to execute computer executable instructions or computer code embodied in the memory 124 or in other memory that implement the logic described below for the coordinated routing system 102. As examples, the memory 124 may store program logic that implements the routing engine 110, the audio/video manager 112, the portal application 114, the web services 116, and the custom application 118.

The systems 100 and 102 may be implemented in many different ways. For example, the coordinated routing system 102 may be implemented as a single device or as multiple devices. Each one of the multiple devices may include one or more processors, such as the processor 122. Any one of the components in the coordinated routing system 102, such as the routing engine 110, may be implemented as program logic embedded in the memory 124, a hardware circuit, or any combination thereof. The components may be packaged together or include other components. For example, the routing engine 110 may include the audio/video manager 112. Each one of the components may include a respective database for use by the respective component. Alternatively or in addition, two or more of the components may share a database. Consequently, when one component is described as transmitting information to or receiving information from another component, that information may be directly transmitted to or received from a database.

The custom application 118 and the portal application 114 are illustrated in FIG. 1 as part of the coordinated routing system 102. However, in a different implementation, the custom application 118 and the portal application 114 may be client-server applications that are included in the client station 104, the expert station 106, or both.

The client station 104 may be any device, process, or combination thereof that may be used to provide measurements taken at the client station 104 and communicate the measurements along with the audio/video over the network 108. The client station 104 may include a client SMA interface 130, an audio/video interface 132, a portal interface 134, a device manager 136, and at least one device 138 for measuring data at the client station 104. The client station 104 may include additional, different, or fewer components. For example, the client station 104 may include a processor and a memory, such as the processor 122 and the memory 124, respectively. In one example, the client station 104 may not include the client SMA interface 130.

One example of the client station 104 includes a pod for a patient to provide remote health diagnostic information about the patient over the network 108. The pod may be fully enclosed and self-contained. A second example of the client station 104 includes a banking expert advice station that connects with a remote banking expert. A third example of the client station 104 includes a government transaction endpoint that facilitates citizens transacting with one or more government agencies. A fourth example of the client station 104 consists of a laptop or computer connected to the device 138 and video conferencing equipment. The client station 104 may be any suitable form factor because the coordinated routing system 102 may determine where the request to create the session comes from and the device manager 136 may determine what devices 138 are included in or in communication with the client station 104.

The device 138 at the client station 104 may be any device or combination of devices that measures or otherwise senses physical characteristics. For example, the device 138 may include a thermometer, a retina camera or other biometric device. The device 138 in the remote health diagnostic example may include a stethoscope, a heart monitor, a sphygmomanometer, ear nose & throat scopes, echocardiographs, ultrasound, any other medical device, or any combination thereof. The device 138 in the banking client example may include a scanner, a credit card reader and/or issuing device, an electronic signature pad, a cash dispensing device, a printer, any transactional device that facilitates completion of a financial transaction, or any combination thereof. The financial transaction may be the client signing a loan document, for example. The device 138 in the government transaction example may include the biometric device to verify the identity of the citizen.

The audio/video interface 132 may be any device, process, or combination thereof that receives and transmits audio/video over the network 108. Examples of the audio/video interface 132 include a telephone, a VoIP soft phone, audio/video streaming program, an endpoint in a high-definition television-based system, such as TELEPRESENCE™, which is a registered trademark of Cisco Technologies. In one example, the audio/video interface 130 includes a speaker, a microphone, a display screen, and a video camera. In a second example, the audio/video interface 130 includes software that runs on a computer.

The portal interface 134 may be any device, process, or combination thereof through which a user may communicate with the coordinated routing system 102. For example, the portal interface 134 may include a display device on which the portal interface 134 displays a login screen. Alternatively or in addition, the portal interface 134 may generate a graphical user interface on a display device included in the audio/video interface 132. In one example, the portal interface 134 may be in communication with the portal application 114. Alternatively or in addition, the portal interface 134 may be in communication with the custom application 118.

The device manager 136 may be any device, process, or any combination thereof that gathers data from the devices 138 at the client station and transmits that data over the network 108. For example, the device manager 136 may include a physical interface to the devices 138 at the client station. In one example, the device manager 136 may include a web server that transmits data gathered from the devices 138 in response to HTTP (Hypertext Transfer Protocol) requests. In a second example, the device manager 136 may include a TCP/IP (transmission control protocol/Internet Protocol) server from which the data gathered from the devices 138 may be transmitted over the network 108. In a third example, the device manager 136 includes computer instructions configured to transmit the gathered data over the network 108. The device manager 136 may provide an application programmer interface (API) in order to enable $3^{rd}$ party devices to be added to the system 100. The device manager 136 may be in communication with the portal interface 134 so that a new devices portal may display information about the newly added device and/or control the newly added device. Alternatively or in addition, the device manager 136 may communicate with portal application 114 to enable registering an new application or user interface control for displaying information about the newly added device and/or control the newly added device.

The client SMA interface 130 may be any device, process, or any combination thereof that communicates with the SMA 120. Other devices or processes in the client station 104, such as the portal interface 144 and the device manager 146 may communicate with the SMA 120 via the client SMA interface 130. Alternatively or in addition, other devices or processes in the expert station 106 may communicate directly with the SMA 120. For example, the device manager 136 may communicate with the client SMA interface 130 instead of communicating with the SMA 120 directly.

The expert station 106 may be any device, process, or combination thereof that may receive data measured at the client station 104 and communicate the audio/video over the network 108. The data measured at the client station 104 may be referred to as telemetry data. The telemetry data may be in any number of forms, such as discrete values, a data stream, real-time data, store-and-forward data (data that is measured, stored, and then forwarded as a group from the client station 104), or any other form now known or later discovered. The expert station 106 may include an expert SMA interface 140, an audio/video interface 142, a portal interface 144, a device manager 146, and a device 148 in communication with the device manager 146. The expert station 106 may include additional, different, or fewer components. For example, the expert station 106 may include a processor and a memory, such as the processor 122 and the memory 124, respectively. In one example, the expert station 106 may not include the device 148. Alternatively or in addition, the expert station 106 may not include the expert SMA interface 140.

One example of the expert station 106 includes a doctor station from which a doctor may offer medical advice to a patient at the client station 104. A second example of the expert station 106 includes a banking station from which a financial expert may render advice or otherwise help a client at the client station 104. A third example of the expert station 106 includes a laptop and teleconferencing equipment. A fourth example of the expert station includes a single computer. The expert station 106 may be any suitable form factor. Additionally, the expert station 106 may serve as a client station 104. For example a primary care doctor at the expert station 106 may desire advice from a cardiologist. The expert station 106 may generate a request to start the session between the expert station 106 of the primary care doctor and another expert station 106 staffed by a suitable cardiologist. The patient may or may not be present at the expert station 106 staffed by the primary care doctor.

The device 148 at the expert station 106 may be any device or combination of devices to assist an expert. Examples of the device 148 include, but are not limited to, an electronic signature pad, headphones, a printer, a specialized display device, and a control device that controls a corresponding device at the client station 108, such as a control for a cash dispensing device or credit card issuing device 138 at the client station 104.

The audio/video interface 142 in the expert station 106 may be any device or combination of devices that receives and transmits audio/video over the network 108. Examples of the audio/video interface 142 include a telephone, a VoIP soft phone, audio/video streaming program, an endpoint in a high-definition television-based system, such as TELEPRESENCE™, which is a registered trademark of Cisco Technologies. In one example, the audio/video interface 142 includes a speaker, a microphone, a display screen, and a video camera. In a second example, the audio/video interface 142 includes software that runs on a computer.

The portal interface 144 in the expert station 106 may be any device, process, or combination thereof through which a user may communicate with the coordinated routing system 102. For example, the portal interface 144 may include a display device on which the portal interface 144 displays a login screen. Alternatively or in addition, the portal interface 144 may generate a graphical user interface on a display device included in the audio/video interface 142 of the expert station 106. In one example, the portal interface 144 may be in communication with the portal application 114. In a second example, the portal interface 144 may be in communication with the custom application 118. In a third example, the portal interface 144 may be a client/server application in communication with the SMA 120.

The device manager 146 in the expert station 106 may be any device, process, or any combination thereof that communicates with the devices 148 at the expert station 106. Alternatively or in addition, the device manager 146 may communicate with devices 138 in the client station 104. In one example, the device manager 146 may include a physical interface to the devices 148 in the expert station 106. In a second example, the device manager 146 may include a web server that transmits data gathered from the devices 148 in the expert station 106 in response to HTTP (Hypertext Transfer Protocol) requests. In a third example, the device manager 146 may include a TCP/IP (transmission control protocol/Internet Protocol) server from which the data gathered from the devices 148 may be transmitted over the network 108. In a fourth example, the device manager 146 may include computer instructions configured to transmit the gathered data over the network 108.

The expert SMA interface 140 may be any device, process, or any combination thereof that communicates with the SMA 120. Other devices or processes in the expert station 106, such as the device manager 146, may communicate with the SMA 120 via the expert SMA interface 140. Alternatively or in addition, other devices or processes in the expert station 106 may communicate directly with the SMA 120.

During operation of the system 100 for rule-based routing of coordinated streams of video and measured data, the coordinated routing system 102 matches the expert station 106 with the client station 100. For example, any number of experts may, using the portal interface 144 of the corresponding one of the expert stations, authenticate with the coordinated routing system 102. During authentication, the portal interface 144 may be in communication with the portal application 114. In one example, the portal application 114 may include a database of authentication information against which credentials received via the portal application 114 are authenticated. In a second example, the portal application 114 may communicate with the SMA 120 and/or the routing engine 110 to authenticate the credentials against authentication information of the SMA 120 and/or the routing engine 110.

In response to successful authentication, the portal application 114 may register the expert station 106 with the SMA 120. For example, the portal application 114 may communicate information about the expert station 106 to the SMA 120. Examples of the information about the expert station 106 include a network address of the expert station 106, a telephone number of the audio/video interface 142 in the expert station 106, an identity of the expert at the expert station 106, devices 148 in the expert station 148, and any other information about the expert station 106, such as known or acquired criteria or credentials associated with the expert. The SMA 120 may store the information about the expert station 106 in the SMA database 150.

Alternatively or in addition, the SMA 120 may request that the routing engine 110 notify the SMA 120 if the routing engine 110 subsequently routes an audio/video connection to the audio/video interface 142 of the expert station 106. For example, the SMA 120 may register with the routing engine 110 as a call agent associated with the audio/video interface 142 in the expert station.

Alternatively or in addition, in response to successful authentication, the portal application 114 may redirect the portal application 114 to display pages generated by the custom application 118. For example, the custom application 118 may include an application for doctors. After the doctor authenticates, the doctor may be redirected to the application for doctors through the portal interface 144 at the expert station 108.

The custom application 118 may communicate with the SMA 120 to determine whether any sessions are active with the expert station 140. For example, the custom application 118 may invoke APIs in the web services 116 to communicate with the SMA 120. In one example, each one of the experts may indicate, via the portal interface 144, that the expert is available to receive client requests. In response, the custom application 118, the portal application 114, and/or the SMA 120 may indicate to the routing engine 110 that expert station 106 is available to receive client requests.

After the expert station 106 is available to receive client requests, the coordinated routing system 102 may route sessions from the client station 104 to the expert station 106. For example, a client at the client station 104 may use the portal interface 134 to authenticate with the coordinated routing system 102. During authentication, the portal interface 134 may be in communication with the portal application 114. In one example, the portal application 114 may include a database of authentication information against which credentials received via the portal interface 134 are authenticated. In a second example, the portal application 114 may communicate with the SMA 120 and/or the routing engine 110 to authenticate the credentials against authentication information of the SMA 120 and/or the routing engine 110.

In response to successful authentication, the portal application 114 may register the client station 104 with the SMA 120. For example, the portal application 114 may communicate information about the client station 104 to the SMA 120. Examples of the information about the client station 104 include a network address of the client station 104, a telephone number of the audio/video interface 132 in the client station 104, an identity of the client at the client station 104, devices 138 in the client station 104, connect information for obtaining the telemetry data generated by the devices 138, client need information, and any other information about the client station 104. Examples of the connect information for obtaining the telemetry data include, but are not limited to, an IP address of the client station 104, a path portion of a URL (universal resource locator) to a web server in the device manager 136 in the client station 104, and a port number. SMA 120 may store the information about the client station 104 in the SMA database 150.

The portal interface 134 may be customized based on a profile of the client, access rights assigned to the client, or functionality desired by the client. For example, the portal interface 134 may display in a language spoken by the client based on a language preference of the client. The portal application 114, upon authentication of the client, may redirect the portal interface 134 to the custom application 118. For example, the custom application 118 may include an application for health care patients that the client interacts with via the portal interface 134.

The custom application 118 may receive, from the client station 104, a request to connect with an expert that meets at least one criterion. For example, in response to an action taken by the client, the portal interface 34 may transmit the request for expert assistance to the custom application 118 over the network 108. For example, the criteria may indicate the expert is to be a Spanish speaking female pediatric doctor who is based in the state of California in United States of America.

The request to connect to an expert may be any type of request. In one example, the request may be an HTTP request. In a second example, the request may include initiating a phone call to a phone number of the coordinated routing system 102 from the client station 104. In response to verbal prompts received during the phone call, an operator may press keys on a phone keypad in the audio/video interface 132. The keypad selections may be transmitted through the phone call using dual-tone multi-frequency signaling (DTMF) and received at the coordinated routing system 102. The keypad selections may represent answers to questions, the criteria being based on the answers provided. In a third example, the request may include a first request and a second request. The first request may be for identities of available experts meeting the criteria, and the second request may include an identity of one of the available experts selected by the client.

The custom application 118 may transmit the criteria to the SMA 120 and the SMA 120 may generate the routing script 126 suitable for the routing engine 110. The SMA 120 may generate the routing script 126 differently depending on whether the SMA 120 does the matching or whether the routing engine 110 does the matching. If the routing engine 110 does the matching, then the routing script 126 may include the criteria. The routing engine 110 may search the SMA database 150 for an available expert meeting the criteria. If an expert is available, then the routing engine 110 may initiate a session between the client station 104 and the matching expert station 106. When initiating the session, the routing engine 110 may establish the audio/video connection and the device connection in the session. However, if all experts that meet the criteria are busy with other customers or otherwise unavailable, the session may be queued, waiting for a suitable expert to become available.

Alternatively, if the SMA 120 does the matching, then the routing script 126 may include identification of the matching expert station 106. To do the matching, the SMA 120 may search the SMA database 150 for an expert matching the criteria. If a matching available expert is available, then the SMA 120 may generate the routing script 126 that includes the identity of the matching expert station 106. In response to receiving the routing script 126, the routing engine 110 may initiate a session between client station 104 and the expert station 106 identified in the routing script 126. However, if all experts that meet the criteria are busy with other customers or otherwise unavailable, the session may be queued, waiting for a suitable expert to become available.

In one example, the routing engine 110, in order to initiate the session, may transmit the identity of the expert station 106 to the audio/video manager 112. For example, the routing engine 110 may transmit an Internet Protocol address of the expert station 106 to the audio/video manager 112.

The audio/video manager 112 may subsequently establish the audio/video connection between the client station 104 and the expert station 106. Accordingly, the audio/video manager 112 may transmit instructions over the network to at least one of the audio/video interfaces, 134 and 142, in the client station 104 and the audio/video interface 142 in the expert station 106 to establish a connection between the client station 104 and the expert station 106. In response to receipt of the instructions, for example, the client station 104 may establish a VoIP connection to the expert station 106 identified in the instructions. For example, the client station 104 may establish the VoIP connection by transmitting a SIP (session initiation protocol) message to a network address of the expert station 106. Alternatively or in addition, the audio/video manager 112 may establish a video conference between the client station 104 and the expert station 106 and relay audio and video between the stations.

Once the audio/video connection is established between the client station 104 and the expert station 106, the client and the expert may see and/or hear each other. Additionally, the routing engine 110 may transmit an identity of at least the expert station 106 to the SMA 120 indicating that the audio/video connection is established. The routing engine 110 may transmit the identity of the expert station 106 because the SMA 120 previously registered as a call agent for the expert station 106. Because the SMA 120 received the request to connect from the client station 104, the SMA 120 is in possession of identities of the client station 104 and the expert station 106.

Once in possession of the identities of the stations at either end of the audio/video connection, the SMA 120 may create the session in the SMA database 150. The SMA 120 may associate information about the client station 104 and the expert station 106, which was received during registration, with the session in the SMA database 150. For example, the SMA 120 may associate the session with the connect information for obtaining the telemetry data generated by the devices 138 in the client station 104. Accordingly, in one example, the SMA 120 may transmit the connect information to the device manager 146 in the expert station 106. The device manager 146 in the expert station 106 may then establish one or more connections to retrieve the telemetry data from the client station 104.

Alternatively or in addition, the custom application 118 may obtain the connect information from the SMA 120. The custom application 118 may then establish at least one connection to the client station 104 based on the connection information. The custom application 118 may retrieve the telemetry data from the client station 104. The custom application 118 may process the telemetry data such that an expert may view and analyze the telemetry data through the portal interface 144 in the expert station. Alternatively or in addition, the custom application 118 may process the telemetry data such that the client at the client station 104 may also view the telemetry data through the portal interface 134 in the client station.

The SMA 120 may end the session in response to one or more of the connections terminating. For example, the SMA 120 may end the session if the audio/video connection closes.

A conference session may include sessions between more than two stations. For example, a conference session may include an audio/video connection between the client station 104, the expert station 106, and a second expert station. For example, the expert at the expert station 106, after communicating with the client at the client station 104, may decide to consult another expert. As a result, the conference session may include connections associated with the second expert station. In one example, the expert may interact with the portal interface 144 in the expert station 106 to request a connection with an identified expert at the second expert station. The expert may wish to consult with a specialist. In a first example, the expert may view a list of available specialists in the portal interface 144. The custom application 118 may receive the list of available specialists from the SMA 120. The expert may select one of the available specialists through the portal interface 144, where the selected specialist is associated with the second expert station. In response, the custom application 118 may transmit, to the SMA 120, a request to include the second expert station in an audio/video conference with the first expert station 106 and the client station 104. In a second example, the expert may interact with the portal interface 144 to request a connection with any available expert that meets at least one criterion. In response, the custom application 118 may transmit a request to the SMA 120 to include the second expert station in the audio/video conference.

Alternatively or in addition, the second expert may be able to view the telemetry data or control the devices 138 in the client station 104 at the second expert station in a manner similar to how the first expert may do so. For example, the SMA 120 may initiate one or more additional device connections between the client station 104 and the second expert station so that that second expert station may receive the telemetry data. Alternatively or in addition, the custom application 118 may already be receiving the telemetry data for presentation to the first expert station 106. Therefore, the custom application 118 may present the telemetry data in the portal interface 144 of the second expert station. In a medical example, two doctors, each at a respective one of the expert stations, may each see the patient as well as the medial data measured at the client station 104. The two doctors may also confer with each other and view data from devices 148 in either of the two expert stations.

Figure 2:
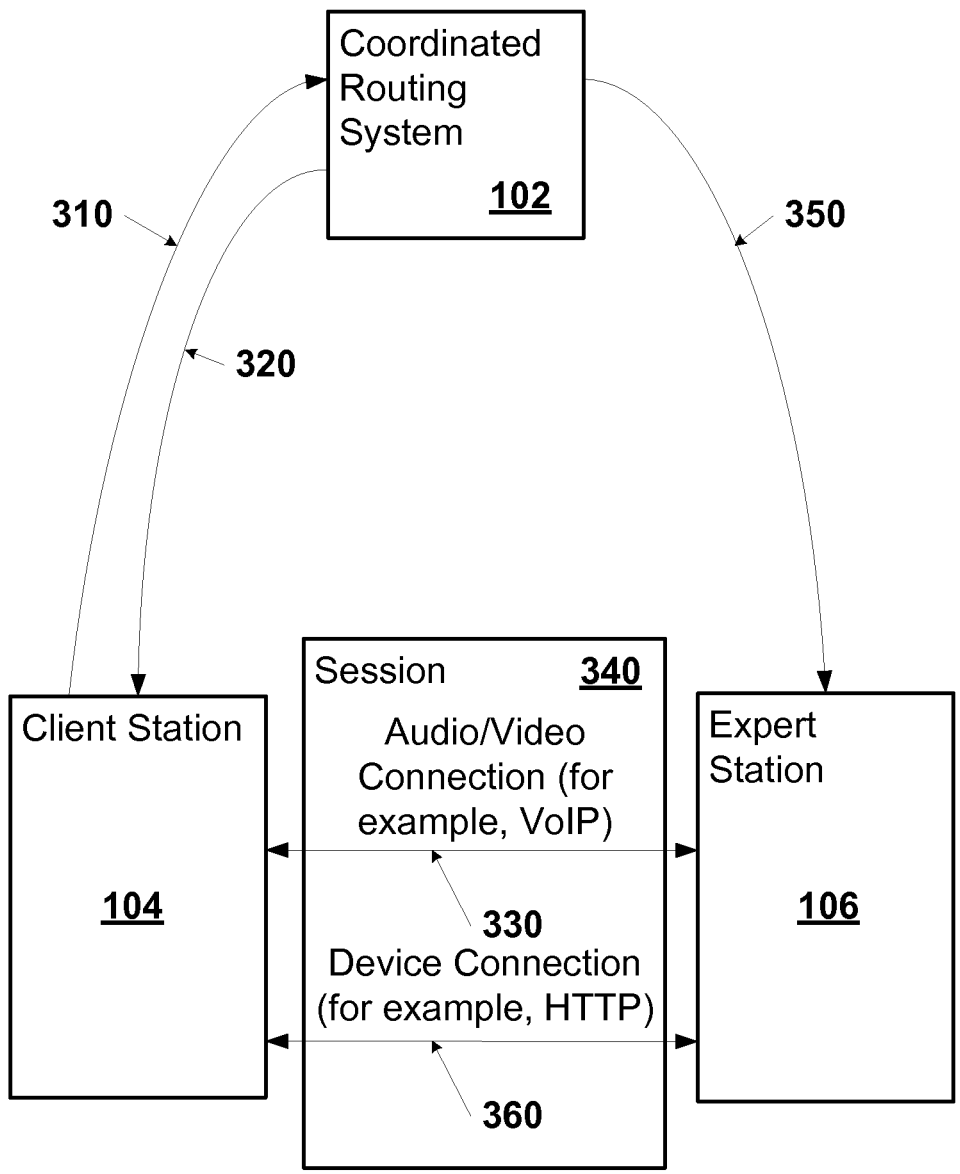
FIG. 2 illustrates a second embodiment of a system for rule-based routing of coordinated streams of video and measured data.

FIG. 2 illustrates a second embodiment of the system 100 for rule-based routing of coordinated streams of video and measured data. The system 100 may include the client station 104, the coordinated routing system 102, the expert station 106, and any number of additional client stations and expert stations.

During operation of the system 100, the client station 104 may transmit the request 310 to communicate with an expert matching at least one criterion to the coordinated routing system 102. In response, the coordinated routing system 102 may determine an identity of the expert station matching the request 310. The coordinated routing system 102 may transmit an instruction 320 to the client station 104 that instructs the client station 104 to open the audio/video connection 330 between the client station 104 and the expert station. The instruction may include the network identity of the expert station 106. In response, the client station 104 may open the audio/video connection 330, for example, by transmitting a SIP invite message to the expert station 106.

The coordinated routing system 102 may create a database entry corresponding to the session 340 that includes the information about the client station 104 and/or the expert station 106, such as identities of each of the stations, 104 and 106. The coordinated routing system 102 may store an indication that the audio/video connection 330 is established in the SMA database 150 and associate the indication with the database entry corresponding to the session 340. At registration, the client station 104 may have transmitted to the coordinated routing system 102 the connect information for obtaining the telemetry data generated by the devices 138 in the client station 104. Therefore, the coordinated routing system 102 may now transmit a message 350 to the expert station 106 that includes the connect information.

The expert station 106, sometime during the session, may open the device connection 360 to the client station 104. The expert station 106 may open additional device connections during the session 340. The expert station 106 may open and close the device connection 360 multiple times during the session 340.

The coordinated routing system 102 may route any number of streams as a bundle of streams to be routed together during the session 340. For example, the connect information may be transmitted by the client station 104, the expert station 106, or both during registration or at some point thereafter. The connect information may include information related to forming connections that transport all or a portion of the streams. The streams may be bi-directional, transporting information in either direction between the client station 104 and the expert station 106. The expert station 106, the client station 104, or any combination thereof may transmit a request to the client station 104, the expert station 106, or the coordinated routing system 102 in order to establish the respective one of the streams. The streams may include audio, voice, video, text, hypertext, or any other type of data.

When the audio/video connection 330 closes, the session 340 may be terminated. Accordingly, the coordinated routing system 102 may delete database entry corresponding to the session 340 from the SMA database 150.

Figure 3:
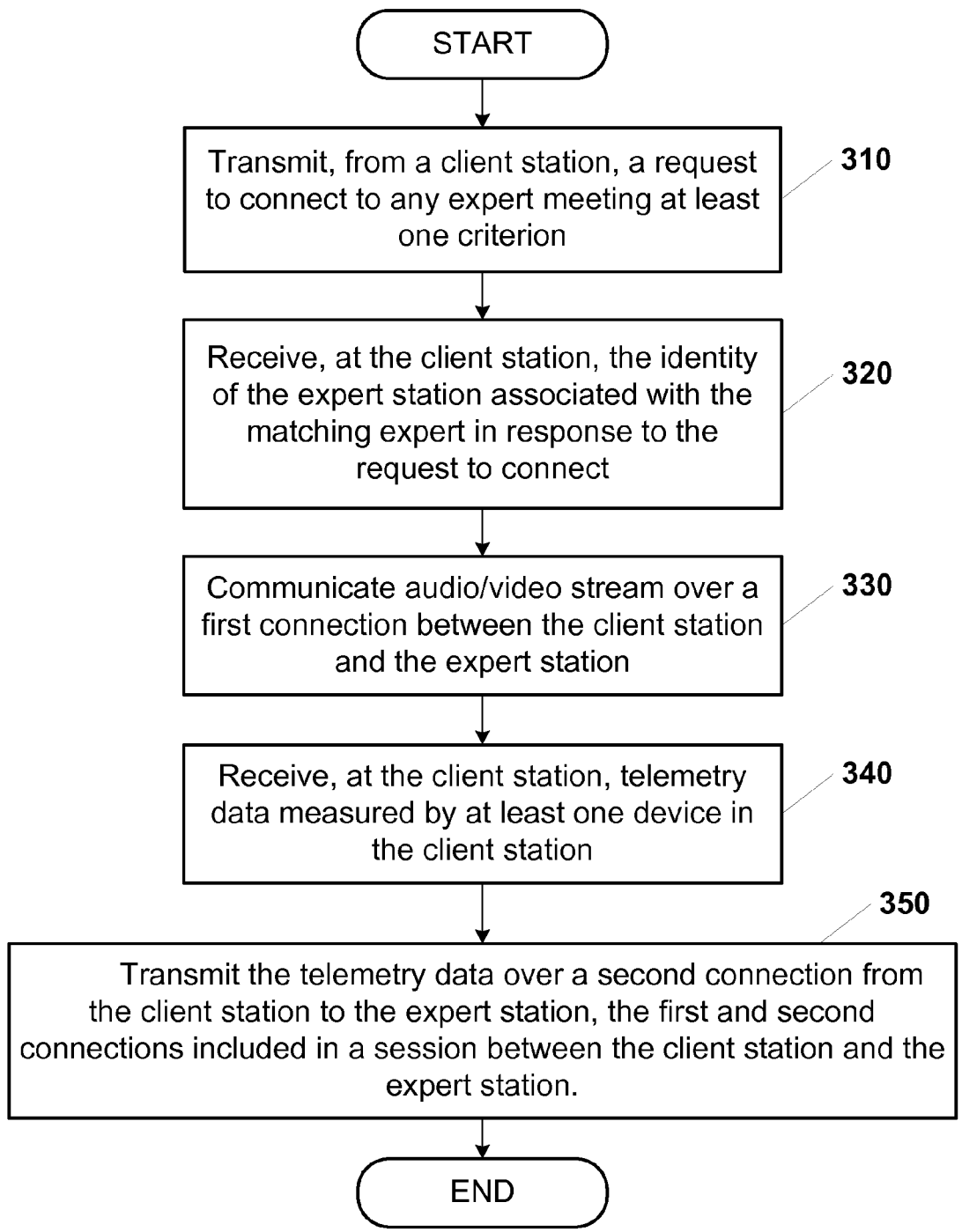
FIG. 3 illustrates one embodiment of a method to route coordinated streams of video and measured data.

FIG. 3 illustrates one embodiment of a method to route coordinated streams of video and measured data. The method is implemented by the system 100 of FIG. 1 or a different system. Additional, different, or fewer acts may be performed. The acts may be performed in a different order than illustrated in FIG. 3.

In act 310 of the embodiment illustrated in FIG. 3, the operation may begin by transmitting, from the client station 104, the request 310 to connect to any expert that meets at least one criterion. The at least one criterion and the request in the example illustrated embodiment do not include an identity of a matching expert or an identity of an expert station 106 associated with the matching expert. For example, the client station 104 may transmit a request to connect to a loan officer who speaks English and who is located in a particular geographic region.

The coordinated routing system 102 may determine an identity of the expert station 106 matching the request. The coordinated routing system 102 may transmit the instruction 320 to the client station 104 instructing the client station 104 to establish the audio/video connection 330 with the expert station 106.

The operation may continue in act 320 by receiving, at the client station 104, the identity of the expert station 106 associated with the matching expert in response to the request to connect. For example, the client station 104 may receive a network address of the expert station 106 in the instruction 320 to establish the audio/video connection 330.

In act 330, the operation may continue by communicating an audio/video stream over the audio/video connection 330. For example, the client station 104 may communicate the audio/video stream as part of a video conferencing call between the client station 104 and the expert station 106.

In one example, the expert station 106 may receive, from the coordinated routing system 102, the message 350 that includes the connect information for obtaining the telemetry data generated by the devices 138 in the client station 104. The expert station 106 may open the device connection 360 from the expert station 106 to the client station 104.

In act 340, the operation may proceed by receiving, at the client station 104, telemetry data measured by the device 138 in the client station 104. For example, the device manager 136 may receive an audio signal from a stethoscope.

In act 350, the operation may include transmitting the telemetry data over the device connection 360 to the expert station 106, where the audio/video connection 330 and the device connection 360 are included in the session 340 between the client station 104 and the expert station 106. For example, the client station 104 may transmit the audio signals received from stethoscope to the expert station 106, which a doctor may hear through headphones at the expert station 106. The operation may end, for example, by closing audio/video connection 330 and the device connection 360.

The system 100 for rule-based routing of coordinated streams of video and measured data may have advantages over current remote expert access systems environments. Current remote expert access systems connect two endpoints directly only after a deliberate action of the operator to connect to a specific endpoint. For example, the operator may indicate that the system is to connect to "expert X" or to a specific physical location of the endpoint. Experts may operate independently, such as from a respective place of business of the expert, in a contact center environment, or even in the respective homes of the experts.

Figure 4:
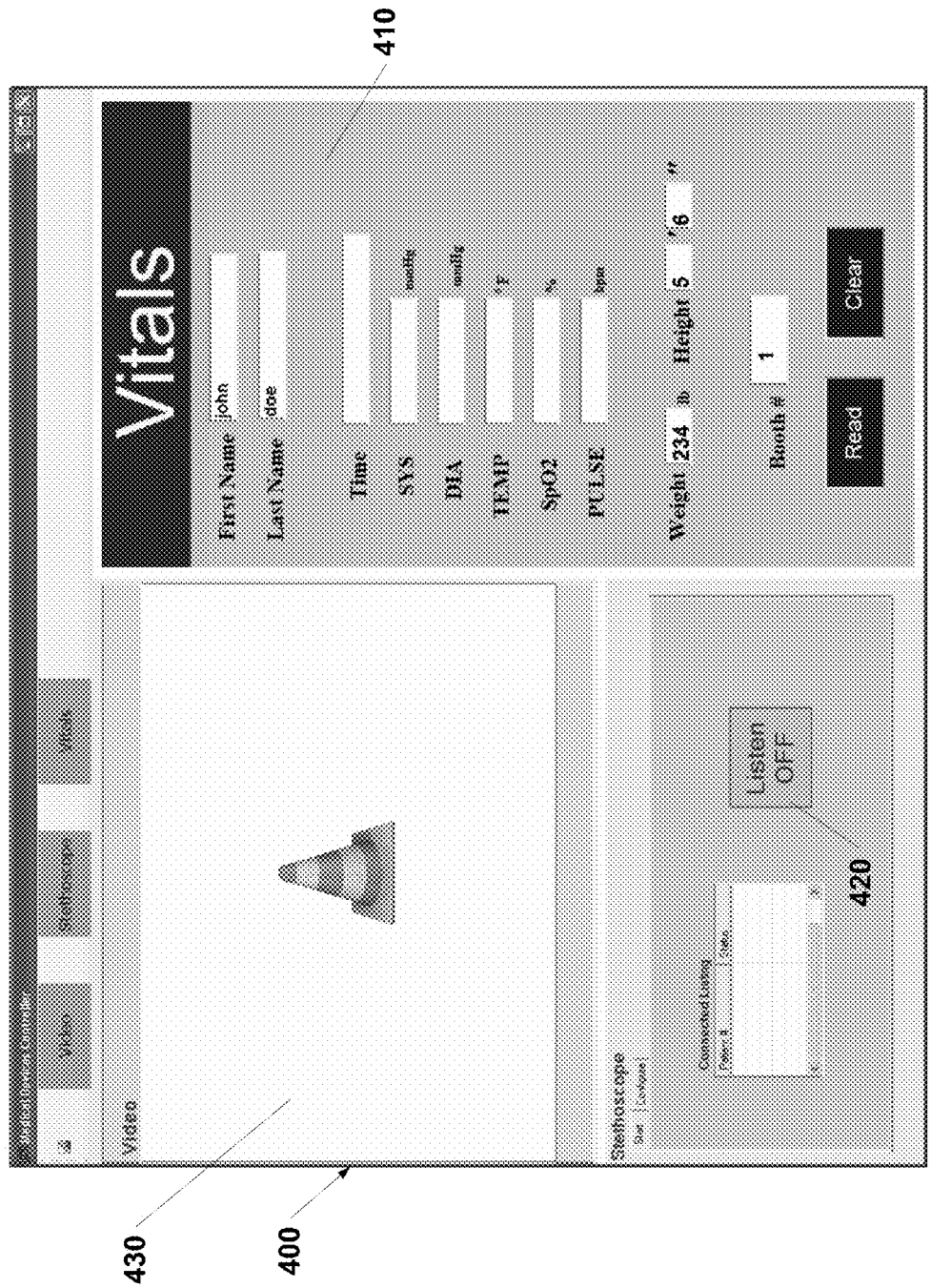
FIG. 4 illustrates a screenshot of an example of a portal interface in an expert station.

FIG. 4 illustrates a screenshot 400 of an example of the portal interface 144 in the expert station 106. The screenshot 400 includes a display of patient vitals 410, a device control 420 to turn a stethoscope on or off, a display area 430 to display video gathered by a hand-held camera. The stethoscope, hand-held camera, and any other device used to obtain the patient vitals may be included in the client station 104.

The system 100 may provide a new transformative health care industry solution that creates a live "face-to-face" visit experience for clinicians and patients. The system 100 may be an integrated communication and collaboration platform. Patients may access clinical services through client stations provided by remotely located health care providers to provide primary, specialty, pharmacy, mental health services or counseling.

Besides providing videoconferencing capabilities between stations, the system 100 establishes and maintains sessions that are data rich by virtue of the integrated third party devices and other data sources. Sessions may be established by virtue of data, images, and sound being routed between the client station 104 and the expert station 106 dynamically based on customizable rules. Sessions may involve multiple endpoints that participate in a multipoint conference session. Data may originate from the client station 104, from a hosted third party application through an invoked web service using the coordinated routing system 102 and/or from third party medical devices.

The system 100 may rely on a secure broadband connection, such as a private network or a virtual private network, from a patient station to a healthcare provider station, located at the remote facility. The configuration enables a remote healthcare provider to review physiological data of the patient in real-time on a personal computer as well as to converse with the patient and/or an attendant at the patient station. The system 100 may provide a vender-agnostic, plug-and-play interface with medical devices so the system 100 may be used in a variety of health services, such as primary, specialty, mental health, disease management; and in a variety of environments, such as clinical, retail, community, educational or corporate campuses, prisons, rural or urban communities, and mobile units using satellite or wireless communications.

The system 102 may be implemented as a three-tier (having an infrastructure layer, a services layer, and an application layer), service-oriented network architecture. Thus, the system 102 may be implemented as a hosted environment where applications services may be hosted in the "cloud." Furthermore, end users may use the hosted services following a secure login through the SMA 120.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
    a memory; and
    a processor in communication with the memory, the memory including computer code executable with the processor, wherein the computer code is configured to:
    receive a request from a first device at a client station to communicate with a matching expert determined from a plurality of available experts, wherein the matching expert matches at least one criterion specified in the request from the first device, and wherein the at least one criterion includes a type of medical expertise;
    determine an identity of an expert station associated with the matching expert; and
    establish a session between the client station and the expert station, the session including a first connection and a second connection, the first connection being for transmission of at least one of a video stream or an audio stream between the first device and the expert station, the second connection being for transmission of telemetry data from at least one second device at the client station to the expert station, wherein the telemetry data is transmitted during the transmission of the at least one of the video stream or the audio stream, and wherein the telemetry data is measured at the client station at the at least one second device, and wherein the telemetry data is different than the video stream and the audio stream.

2. The system of claim 1, wherein the at least one criterion of an expert includes at least one of a type of doctor, languages spoken by the expert, a health care provider that the expert is associated with, and insurance providers the expert is associated with.

3. The system of claim 1, wherein the computer code is further configured to transmit a first instruction to the client station, the first instruction being for the client station to establish the first connection to the expert station, and wherein the computer code is further configured to transmit a second instruction to the expert station, the second instruction being for the expert station to establish the second connection to the client station.

4. The system of claim 1, wherein the computer code is further configured to transmit an instruction to the expert station, the instruction being for the expert station to establish the second connection to the client station.

5. The system of claim 1, wherein the expert station is a first expert station and the computer code is further configured to include a second expert station in the first connection and to include a third connection in the session, the first connection being for transmission of audio and video between the client station, the first expert station, and the second expert station, and the third connection being for the transmission of the telemetry data from the client station to the second expert station.

6. The system of claim 1, wherein the request from the client station includes a first request from the client station for identities of any available experts matching the at least one criterion and a second request from the client station including an identified one of the experts.

7. The system of claim 1, wherein the computer code is further configured to transmit an instruction from the expert station to the client station, the instruction being for the expert station to control the at least one second device at the client station.

8. Logic encoded in one or more tangible media for execution with a processor and when executed operable to:
    receive a request, from a client station, to communicate with an available expert matching at least one criterion specified by the client station;
    determine a matching expert from a set of available experts, the matching expert corresponds to the at least one criterion;
    determine an identity of an expert station associated with the matching expert; and
    start a session between the client station and the expert station, the session including a first connection and a second connection, the first connection being for transmission of at least one of a video stream or an audio stream from a first device at the client station, and the second connection being for transmission of telemetry data obtained from a second device at the client station, wherein the telemetry data is distinct from the video stream and the audio stream.

9. The tangible media of claim 8, wherein the logic is further operable to transmit session information associated with the session to the expert station.

10. The tangible media of claim 8, wherein the logic is further operable to provide access to session information associated with the session via an API (application programming interface), the session information including a network location from which the telemetry data may be received.

11. The tangible media of claim 8, wherein the logic is further operable to provide access to session information associated with the session via an API (application programming interface), the session information including information extracted from a database based on an identity of a user at the client station.

12. The tangible media of claim 8, wherein the logic is further operable to transmit any information over the second connection in either direction between the client station and the expert station, wherein the information from the expert station includes commands to the client station to control the second device to obtain the telemetry data.

13. The tangible media of claim 8, wherein the logic is further operable to provide the first connection using a first communication protocol and the second connection using a second communication protocol.

14. A method comprising:
    transmitting, from a client station, a request to connect to any expert meeting at least one criterion, the at least one criterion and the request not including an identity of a matching expert or an identity of an expert station associated with the matching expert;
    determining the matching expert based on a comparison of the at least one criterion with a plurality of attributes of each of a set of available experts;

obtaining, at the client station, the identity of the expert station associated with the matching expert in response to the request to connect;

communicating at least one of an audio stream or a video stream over a first connection between the expert station and a first device in the client station;

obtaining, at the client station, telemetry data measured by at least one second device in the client station, the telemetry data being separate from the audio stream and the video stream; and transmitting the telemetry data over a second connection from the at least one second device in client station to the expert station, the first and second connections included in a session between the client station and the expert station.

15. The method of claim 14, wherein transmitting the request comprises initiating a phone call to a phone number and transmitting keypad selections selected in response to verbal prompts received during the phone call.

16. The method of claim 14, wherein transmitting the request comprises transmitting a hypertext transfer protocol request to a session management application.

17. The method of claim 14 further comprising transmitting connect information from the client station to a session management application, the connection information for establishment of the second connection, the second connection being for transmission of a prescription from the expert station to the client station in addition to the telemetry data.

18. The method of claim 14, further comprising transmitting connect information from a session management application to at least one of the client station or the expert station and establishing at least one bi-directional connection between the client station and the expert station in response to at least one connection request transmitted from either the client station or the expert station based on the connect information, the session including the at least one bi-directional connection, the first connection, and the second connection.

19. The method of claim 14, further comprising accepting the second connection in response to a connection request transmitted from the expert station, the connection request transmitted from the expert station in response to receipt of connect information at the expert station.

20. The method of claim 14, further comprising controlling the at least one device in the client station from the expert station associated with the matching expert.

* * * * *